(12) United States Patent
Bonelli

(10) Patent No.: US 9,541,032 B2
(45) Date of Patent: Jan. 10, 2017

(54) SORBENT-BASED LOW PRESSURE GASEOUS FUEL DELIVERY SYSTEM

(71) Applicant: Adsorbed Natural Gas Products, Inc., Califon, NJ (US)

(72) Inventor: Robert Allen Bonelli, Califon, NJ (US)

(73) Assignee: Adsorbed Natural Gas Products, Inc., Califon, NJ (US)

( * ) Notice: Subject to any disclaimer, the term of this patent is extended or adjusted under 35 U.S.C. 154(b) by 0 days.

(21) Appl. No.: 14/610,674

(22) Filed: Jan. 30, 2015

(65) Prior Publication Data

US 2015/0330332 A1 Nov. 19, 2015

Related U.S. Application Data

(60) Provisional application No. 61/994,579, filed on May 16, 2014, provisional application No. 62/078,046, filed on Nov. 11, 2014.

(51) Int. Cl.
| | | |
|---|---|---|
| *F02M 21/00* | (2006.01) | |
| *F02M 21/02* | (2006.01) | |
| *B61C 17/02* | (2006.01) | |
| *B67D 7/04* | (2010.01) | |

(Continued)

(52) U.S. Cl.
CPC .......... *F02M 21/0221* (2013.01); *B61C 17/02* (2013.01); *B67D 7/04* (2013.01); *F02D 19/0647* (2013.01); *F02M 21/0218* (2013.01); *F17C 11/007* (2013.01); *F02M 21/0206* (2013.01); *F02M 21/0209* (2013.01); *F02M 21/0212* (2013.01); *F02M 21/0245* (2013.01);

(Continued)

(58) Field of Classification Search
CPC .... F02M 21/02; F02M 21/04; F02M 21/0212; F02M 21/0215; F02M 21/0218; F02M 21/0221; F02M 21/0245; F02M 21/0248; F02M 21/023; F02M 21/0233; F02M 21/0236; F02M 21/039
USPC ................................ 123/525, 527, 575–578
See application file for complete search history.

(56) References Cited

U.S. PATENT DOCUMENTS

| | | | | | |
|---|---|---|---|---|---|
| 2,663,626 | A | * | 12/1953 | Spangler | ........................ 48/190 |
| 2,712,730 | A | * | 7/1955 | Spangler | ........................ 62/611 |
| 3,722,481 | A | * | 3/1973 | Braun | ........................ 123/46 R |

(Continued)

FOREIGN PATENT DOCUMENTS

| | | |
|---|---|---|
| EP | 0812980 A2 * | 12/1997 |
| GB | 2371029 A | 7/2002 |

(Continued)

OTHER PUBLICATIONS

Burchell et al., "Low Pressure Storage of Natural Gas for Vehicular Applications", SAE Technical Paper 2000-01-2205, 2000, 5 pages.

(Continued)

*Primary Examiner* — Thomas Moulis
(74) *Attorney, Agent, or Firm* — Thompson Coburn LLP

(57) ABSTRACT

A fuel extraction and pressurization system for delivering a gaseous fuel from a adsorbent fuel tank to a fuel injection system of an internal combustion engine, wherein the fuel extraction and pressurization system comprises one or more components for applying a vacuum to the interior of the tank to facilitate the extraction of the adsorbed gaseous fuel from the tank and compressing the extracted gaseous fuel to a pressure appropriate for the fuel injection system.

28 Claims, 2 Drawing Sheets

(51) Int. Cl.
  *F02D 19/06* (2006.01)
  *F17C 11/00* (2006.01)
(52) U.S. Cl.
  CPC .......... *F02M 21/0248* (2013.01); *Y02T 10/32* (2013.01); *Y02T 10/36* (2013.01)

(56) References Cited

U.S. PATENT DOCUMENTS

| | | | | |
|---|---|---|---|---|
| 3,807,377 A * | 4/1974 | Hirschler et al. | ............ | 123/575 |
| 4,227,497 A * | 10/1980 | Mathieson | .................... | 123/525 |
| 4,249,502 A * | 2/1981 | Hover | ........................ | 123/557 |
| 4,483,305 A * | 11/1984 | Gilmor | ....................... | 123/557 |
| 4,495,900 A * | 1/1985 | Stockmeyer | .................. | 123/1 A |
| 4,522,159 A * | 6/1985 | Engel et al. | .................. | 123/1 A |
| 4,531,558 A * | 7/1985 | Engel et al. | .................... | 141/44 |
| 4,742,801 A * | 5/1988 | Kelgard | .................... | 123/27 GE |
| 4,749,384 A * | 6/1988 | Nowobilski et al. | ........... | 95/114 |
| 4,887,556 A * | 12/1989 | Gladstone | ................... | 123/1 A |
| 5,033,444 A * | 7/1991 | Kaufman et al. | ............ | 123/527 |
| 5,127,230 A * | 7/1992 | Neeser et al. | ..................... | 62/7 |
| 5,315,973 A * | 5/1994 | Hill et al. | ...................... | 123/304 |
| 5,323,752 A * | 6/1994 | von Herrmann et al. | .... | 123/527 |
| 5,351,656 A * | 10/1994 | Teramoto | ............... | F02B 75/16 123/3 |
| 5,351,726 A * | 10/1994 | Diggins | ......................... | 141/4 |
| 5,375,580 A * | 12/1994 | Stolz et al. | ................... | 123/527 |
| 5,377,645 A * | 1/1995 | Moore | ......................... | 123/525 |
| 5,479,906 A * | 1/1996 | Collie | ................. | F02M 21/0212 123/304 |
| 5,499,615 A * | 3/1996 | Lawrence et al. | ............ | 123/526 |
| 5,501,200 A * | 3/1996 | Bogartz | ........................ | 123/527 |
| 5,584,467 A * | 12/1996 | Harnett | .................. | F02D 21/02 123/527 |
| 5,615,655 A * | 4/1997 | Shimizu | .................. | F02D 37/02 123/344 |
| 5,713,340 A * | 2/1998 | Vandenberghe | ........ | F02B 43/00 123/682 |
| 5,832,906 A * | 11/1998 | Douville et al. | ............. | 123/527 |
| 5,862,796 A * | 1/1999 | Seki et al. | .................... | 123/527 |
| 5,912,424 A * | 6/1999 | Judkins et al. | ................. | 95/143 |
| 6,176,225 B1 * | 1/2001 | Sams et al. | ................... | 123/549 |
| 6,929,679 B2 * | 8/2005 | Muller et al. | ..................... | 95/90 |
| 7,308,889 B2 * | 12/2007 | Post et al. | ..................... | 123/527 |
| 7,309,380 B2 * | 12/2007 | Muller et al. | ................... | 95/141 |
| 7,652,132 B2 * | 1/2010 | Yaghi et al. | .................. | 540/145 |
| 7,662,746 B2 * | 2/2010 | Yaghi et al. | .................. | 502/401 |
| 7,690,365 B2 * | 4/2010 | Lee et al. | ...................... | 123/527 |
| 7,955,415 B2 * | 6/2011 | Farone | ................................ | 95/1 |
| 8,147,599 B2 * | 4/2012 | McAlister | ....................... | 96/154 |
| 8,919,325 B2 * | 12/2014 | Pursifull | ............ | F02M 21/0239 123/198 D |
| 9,181,886 B2 * | 11/2015 | Grant | .................. | F02D 19/0694 |
| 9,194,337 B2 * | 11/2015 | McAlister | .............. | F02M 21/02 |
| 2006/0042606 A1 * | 3/2006 | Van Dyke | ...................... | 123/527 |
| 2009/0070008 A1 * | 3/2009 | Batenburg | ............ | F02D 19/027 701/103 |
| 2009/0229555 A1 * | 9/2009 | Ginzburg et al. | ............. | 123/1 A |
| 2013/0160742 A1 * | 6/2013 | Brown et al. | .................. | 123/456 |
| 2013/0213363 A1 * | 8/2013 | Pruemm | ....................... | 123/491 |
| 2013/0311067 A1 * | 11/2013 | Stockner et al. | ............. | 701/104 |
| 2014/0026868 A1 * | 1/2014 | Dolan et al. | .................. | 123/525 |
| 2014/0033944 A1 | 2/2014 | Foege | | |
| 2014/0096539 A1 * | 4/2014 | Gustafson | .......... | F02M 21/0221 62/49.1 |
| 2014/0123936 A1 * | 5/2014 | Kim et al. | ..................... | 123/299 |
| 2014/0261304 A1 * | 9/2014 | McAlister et al. | ........... | 123/299 |
| 2015/0307076 A1 * | 10/2015 | Leone | .................. | F02D 19/024 701/54 |

FOREIGN PATENT DOCUMENTS

WO    2006/069681 A1    7/2006
WO    2013/130401 A1    9/2013

OTHER PUBLICATIONS

Shen et al., "Effects of Textural and Surface Characteristics of Metal-Organic Frameworks on the Methane Adsorption for Natural Gas Vehicular Application", Microporous and Mesoporous Materials, 2015, pp. 80-90, vol. 212.

Vasiliev et al., "Adsorbed Natural Gas Storage and Transportation Vessels", International Journal of Thermal Sciences, 2000, pp. 1047-1055, vol. 39.

* cited by examiner

SORBENT-BASED LOW PRESSURE GASEOUS FUEL DELIVERY SYSTEM

CROSS-REFERENCE TO RELATED APPLICATIONS

The present application is a non-provisional application claiming the benefit of U.S. Provisional Application 62/078,046, filed Nov. 11, 2014, and U.S. Provisional Application 61/994,579, filed May 16, 2014, each of which is incorporated herein by reference in its entirety.

FIELD OF THE INVENTION

The present invention is generally directed to a fuel delivery system for an internal combustion engine. More specifically, it is directed to a fuel delivery system for delivering gaseous fuels from sorbent-based low pressure gaseous fuel storage systems to the fuel injection systems of an internal combustion engines.

BACKGROUND OF INVENTION

Sorbent-based gaseous fuel storage systems such as activated carbon sorbent storage of natural gas advantageously operate at lower pressures than non-sorbent systems. For example, sorbent storage systems operate at relatively low pressures in a range of about 10 psi (0.07 MPa) to about 1000 psi (7 MPa) compared to 3,600 psi (24.821 MPa) for conventional, non-sorbent systems for internal combustion engines. While the lower pressures associated with sorbent-based systems have the potential of being more readily utilized in applications such as motor vehicles due to the fact that the systems can be less robust, bulky, complicated, and costly than high pressure systems, there have been performance drawbacks that have hindered their acceptance. In particular, getting the adsorbed gaseous fuel out of a tank and delivered to the engine for combustion in a controlled and consistent manner has been a technical challenge.

One reason for the difficulty is due to the relatively low pressures involved, which is as the amount of fuel in a tank is drawn down during operation of the engine. Specifically, the release of adsorbed gaseous fuel is typically a linear relationship with tank pressure. Thus, as the fuel is drawn from the tank, the pressure decreases, which in turn decreases the tendency of fuel to be released. This decrease in pressure has been particularly challenging to operating internal combustion engines which can often require fuel pressures that exceed that of the gaseous fuel in the tank.

Additionally, the type of sorbent and/or type of gaseous fuel can affect the fuel release. In general, the more fuel a particular fuel-sorbent combination can accommodate, the stronger the adsorbtion of the fuel. The stronger the adsorbtion, the less likely the fuel may be consistently delivered to an engine, especially as the pressure decreases. This has tended to limit the selection of sorbents, in particular, the most effective sorbents.

Still further, because the typical modern conventional engines require gaseous fuel to be pressurized for injection into the engine (e.g., up to about 200 psi), a significant amount of fuel has remained essentially unusable/inaccessible in the tank.

In view of the foregoing, a need still exists for equipment and methods for extracting a gaseous fuel from a sorbent-based storage tank in a consistent and controlled manner over a wide range of tank pressures and/or fuel levels. Further, a need still exists for the consistent and controlled delivery of gaseous fuel extracted from a sorbent-based storage tank to the fuel injection system of an internal combustion engine over a wide range of tank pressures and/or fuel levels.

SUMMARY OF INVENTION

In one embodiment, the present invention is directed to a fuel extraction and pressurization system for delivering a gaseous fuel from a fuel storage system to a fuel injection system of an internal combustion engine, wherein the fuel storage system comprises a tank having an interior in which a sorbent is present and to which the gaseous fuel is adsorbed and wherein the gaseous fuel is at a tank pressure in a tank pressure range of about 1000 psi (7 MPa) to about 10 psi (0.07 MPa). The fuel extraction and pressurization system comprising an input in fluid connection with the interior of the tank of the fuel storage system and an output in fluid connection with the fuel injection system and comprising one or more vacuum and pressurization components, wherein during operation the one or more vacuum and pressurization components apply a vacuum to the interior of the tank to facilitate the extraction of the adsorbed gaseous fuel from the tank and compress the extracted gaseous fuel thereby providing compressed gaseous fuel at an output pressure and an output flow rate to the fuel injection system for the operation of the internal combustion engine at or about the stoichiometric air-fuel ratio for the gaseous fuel at any selected throttle position for the internal combustion engine, regardless of the tank pressure within the tank pressure range, wherein the one or more vacuum and pressurization components are selected from the group consisting of a vacuum pump, a compressor, or a vacuum pump and a compressor.

In another embodiment, the present invention is directed to a fuel system comprising:
(a) a fuel storage system that comprises a tank having an interior in which a sorbent is present and to which the gaseous fuel is adsorbed and wherein the gaseous fuel is at a tank pressure in a tank pressure range of about 1000 psi (7 MPa) to about 10 psi (0.07 MPa);
(b) a fuel injection system of an internal combustion engine; and
(c) the above-described fuel extraction and pressurization system.

In yet another embodiment, the present invention is directed to a vehicle comprising the above-described fuel system.

In still another embodiment, the present invention is directed to a process of extracting a gaseous fuel from a fuel storage system and pressurizing the extracted gaseous fuel for delivery to a fuel injection system of an internal combustion engine, wherein the fuel storage system comprises a tank having an interior in which a sorbent is present and to which the gaseous fuel is adsorbed and wherein the gaseous fuel is at a tank pressure in a tank pressure range of about 1000 psi (7 MPa) to about 10 psi (0.07 MPa), the method comprising operating a fuel extraction and pressurization system having an input in fluid connection with the interior of the tank of the fuel storage system and an output in fluid connection with the fuel injection system and comprising one or more vacuum and pressurization components, wherein during operation the one or more vacuum and pressurization components apply a vacuum to the interior of the tank to facilitate the extraction of the adsorbed gaseous fuel from the tank and compress the extracted gaseous fuel thereby providing compressed gaseous fuel at an output pressure and an output flow rate to the fuel injection system for the operation of the internal combustion engine at or about the stoichiometric air-fuel ratio for the gaseous fuel at any selected throttle position for the internal combustion engine, regardless of the tank pressure within the tank pressure range, wherein the one or more vacuum and pressurization components are selected from the group consisting of a vacuum pump, a compressor, or a vacuum pump and a compressor.

DETAILED DESCRIPTION OF INVENTION

One embodiment of the present invention is directed to a fuel extraction and pressurization system for delivering a gaseous fuel from a fuel storage system to a fuel injection system of an internal combustion engine. In another embodiment, the invention is directed to a process of extracting a gaseous fuel from a fuel storage system and pressurizing the extracted gaseous fuel for delivery to a fuel injection system of an internal combustion engine. Still further, another embodiment of the invention is directed to a fuel system comprising said fuel extraction and pressurization system. In yet another embodiment, the invention is directed to a vehicle comprising said fuel system.

It should be noted that embodiments of the fuel extraction and pressurization system may be in the form of a collection of unassembled/unconnected/uninstalled components not ready to be operated so as to deliver fuel to an internal combustion engine or in the form of assembled/connected/installed components ready to be operated so as to deliver fuel to an internal combustion engine.

Fuel Storage System

Figure 1:
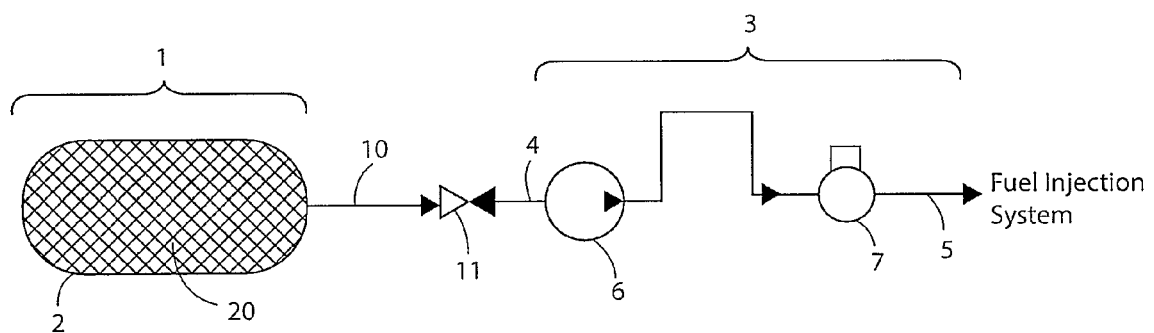
FIG. 1 is a schematic of fuel system comprising an embodiment of a sorbent-based low pressure gaseous fuel delivery system that comprises a fuel extraction and pressurization system comprising a vacuum pump and a compressor.
Figure 2:
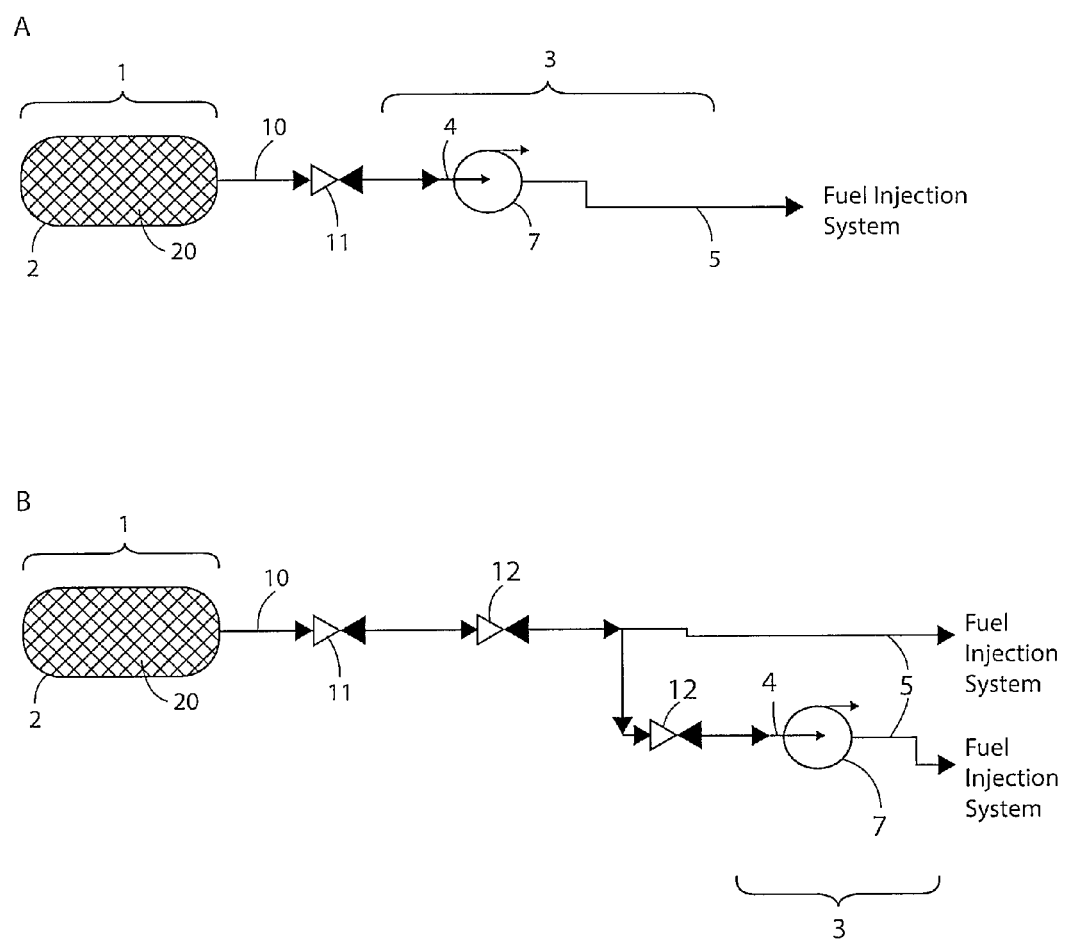
FIG. 2 is a schematic of a fuel system comprising an embodiment of a direct connection sorbent-based low pressure gaseous fuel delivery system and an embodiment of an isolated connection sorbent-based low pressure gaseous fuel delivery system.

The fuel storage system may be any appropriate sorbent-based system. Referring to FIGS. 1 and 2, a fuel storage system 1 may comprise one or more tanks 2 that are distinct from one or more types of sorbent 20. Alternatively, a fuel storage system 1 may comprise one or more tanks 2 for which the tank structure and the sorbent 20 are integral. Still further, a fuel storage system may comprise a combination of distinct and integral tanks. Regardless of the particular type(s), a tank will have an interior (not identified with a numeral) in which a sorbent 20 is present and to which the gaseous fuel (not shown) may be adsorbed. Typically, the gaseous fuel is at a tank pressure in a tank pressure range of about 1000 psi (7 MPa) to about 10 psi (0.07 MPa).

Fuel

Any gaseous fuel (not shown) or combination of gaseous fuels may be used. In one embodiment, the gaseous fuel is selected from the group consisting of methane, ethane, propane, N-butane, I-pentane, N-pentane, N-hexane, nitrogen, and combinations thereof. In another embodiment, the gaseous fuel comprises methane. In yet another embodiment, the gaseous fuel is natural gas.

Sorbent

Any sorbent(s) 20 appropriate for the selected fuel(s) may be used.

In one embodiment, the sorbent is selected from the group consisting of activated carbon, metal-organic frameworks, and combinations thereof. In one embodiment, the sorbent comprises activated carbon. In another embodiment, the sorbent is activated carbon. In one embodiment, the sorbent is one or more types of activated carbon. In another embodiment, the sorbent comprises metal-organic frameworks. In yet another embodiment, the sorbent is one or more types of metal-organic framework. Examples of appropriate activated carbons include those derived from plant origins, such as corn cob, hard woods, soft woods or other similar cellulose structure, or from other carbon rich origins, such as polymers or polymer based materials, and then activated through an alkali, acid, steam, pressure, heat or any combination thereof. Examples of appropriate metal-organic frameworks include those materials that are porous polymeric material, consisting of metal ions linked together by organic bridging ligands.

Fuel Injection System

Similarly, the fuel injection system (not shown) for the internal combustion engine may be any system appropriate for delivering the selected gaseous fuel(s) to the engine for combustion appropriate system. Typically, the gaseous fuel is delivered to the internal combustion engine at or about the stoichiometric air-fuel ratio for the gaseous fuel. Examples of commercially available fuel injection systems include Westport Innovation, Inc.'s WING™ Power System.

Fuel Extraction and Pressurization System

The fuel extraction and pressurization system (FEPS) 3 is in fluid connection with the interior of the tank of the fuel storage system and the fuel injection system. Fluid connections may be accomplished using any appropriate fuel lines 10, fittings, connectors, seals, valves 11, washers, etc. As the name implies, the FEPS extracts fuel from the tank by application of a vacuum and increases the pressure of the extracted fuel for delivery to the internal combustion engine via the fuel injection system. The FEPS comprises one or more components that are selected and/or controllable so as to deliver the extracted and compressed gaseous fuel to the fuel injection system for the operation of the internal combustion engine at or about the stoichiometric air-fuel ratio for the gaseous fuel at any selected throttle position for the internal combustion engine, regardless of whether the tank pressure is less than that needed for delivery to the internal combustion engine.

More particularly, the FEPS has (i) an input 4 to be placed in fluid connection with the interior of the tank of the fuel storage system and during operation applies a vacuum to the interior of the tank to facilitate the extraction of the adsorbed gaseous fuel from the tank and (ii) an output 5 from which the extracted gaseous fuel is provided to the fuel injection system (not shown) at a output flow rate and a output pressure appropriate for the particular internal combustion engine application. In one embodiment, the output flow rate is in a range of about 10 to about 1,200 grams per minute and the output pressure is in a range of about 10 psi (0.07 MPa) to about 200 psi (1.38 MPa).

The components of the fuel extraction and pressurization system may be selected from the group consisting of one or more vacuum pumps 6 and/or compressors 7 that provide a vacuum at the input in fluid connection with the tank(s) and an increase in pressure or compression at the output in fluid connection with the fuel injection system. Examples of commercially available vacuum pumps include the MINI J Series cylindrical venturi vacuum pump that is available from Vaccon Vacuum Products. In one embodiment, the compressor(s) is/are selected from the group consisting of a rotary scroll compressor, in-line reciprocating compressor, rotary screw compressor, rotary lobe compressor, rotary vane compressor, and combinations thereof. Examples of commercially available compressors of this nature include the Aspen Compressor BLDC Rotary Q-Series Compressors available from Aspen Compressor and the CT-17-700 radial turbo compressor available from Celeroton.

Typically, it is desirable to select the type(s) and number(s) of such components that provide the desired functionality (e.g., degree of vacuum, output flow rate, and output pressure) reliably for as little cost and weight as is reasonable for the particular application. For example, reliability and capacity are more of a concern than cost and weight for heavy duty vehicle applications (e.g., vehicles having engine displacements in excess of 6.2 liters, such 15 liter spark ignited engines).

In one embodiment, the FEPS comprises a vacuum pump with its inlet in fluid connection with the fuel storage system and its outlet in fluid connection with the fuel injection system. In another embodiment (e.g., FIGS. 2 A and B), the FEPS 3 comprises a compressor 7 with its inlet 4 in fluid connection with the fuel storage system 1 and its outlet 5 in fluid connection with the fuel injection system (not shown). In yet another embodiment (e.g., FIG. 1), the FEPS 3 comprises a vacuum pump 6 with its inlet 4 in fluid connection with the fuel storage system 1 and its outlet (not identified) in fluid connection with the inlet (not identified) of a compressor 7, with its outlet 5 in fluid connection with the fuel injection system (not shown).

The vacuum and pressurization components of the FEPS may be independently operated by any appropriate supply of power/energy. For example, one or more of such components may be mechanically-operated, electrically-operated, pneumatically-operated, hydraulically-operated, or a combination thereof. In one embodiment, the vacuum and pressurization component(s) are electrically-operated.

Referring to FIGS. 2 A and B, the FEPS 3 and its fluid connection(s) may be "integral" with, or "isolated" from the fueling circuit. Specifically, in an "integral" or "direct connection" embodiment such as shown in FIG. 2 A, fuel passes through the component(s) of the FEPS when the internal combustion engine is operated, regardless of whether the pressure within fuel storage system is sufficient for delivery of fuel to internal combustion engine. In contrast, in an "isolated" embodiment such as shown in FIG. 2 B, fuel only passes through the component(s) of the FEPS when the pressure in the fuel storage system is at or below a specified pressure (e.g., 150 psi (1.034 MPa)). Thus, when the pressure in the fuel storage system decreases to the specified pressure the FEPS is placed in fluid connection with the fuel storage system and the fuel injection system and operated to apply a vacuum to the storage system and to adequately pressurize or compress the extracted fuel for delivery to the internal combustion engine via the fuel injection system. An "isolated" FEPS may be isolated and then placed in fluid connection through any appropriate device(s) and configuration(s). For example, as shown in FIG. 2 B, a fuel circuit may comprise one or more pressure release valves 12 that keep the fuel extraction and pressurization system 3 "isolated" when the pressure in the fuel storage system 1 is above the specified pressure but when the pressure in the fuel storage system falls to the specified pressure, the pressure release valve(s) would operate (e.g., from being open to being closed or vice versa, depending upon the configuration of the fuel circuit) thereby placing the FEPS in fluid connection with the fuel storage tank and the fuel injection system.

Process

The present invention is also directed to a process of extracting a gaseous fuel from a fuel storage system and pressurizing the extracted gaseous fuel for delivery to a fuel injection system of an internal combustion engine, wherein the fuel storage system comprises a tank having an interior in which a sorbent is present and to which the gaseous fuel is adsorbed and wherein the gaseous fuel is at a tank pressure in a tank pressure range of about 1000 psi (7 MPa) to about 10 psi (0.0.689 MPa). The method comprises operating the fuel extraction and pressurization system comprising a vacuum pump, a compressor, or a combination of a vacuum pump and a compressor having (i) an input to be placed in fluid connection with the interior of the tank of the fuel storage system to apply a vacuum to the interior of the tank to facilitate the extraction of the adsorbed gaseous fuel from the tank and pressurize or compress the extracted gaseous fuel to an output pressure and an output flow rate. Additionally, the FEPS components (e.g., vacuum pump, compressor, or combination) are selected and/or controllable so as to deliver the compressed gaseous fuel to the fuel injection system for the operation of the internal combustion engine at any selected throttle position for the internal combustion engine, regardless of the tank pressure within the tank pressure range.

Having illustrated and described the principles of the present invention, it should be apparent to persons skilled in the art that the invention can be modified in arrangement and detail without departing from such principles.

Although the materials and methods of this invention have been described in terms of various embodiments and illustrative examples, it will be apparent to those of skill in the art that variations can be applied to the materials and methods described herein without departing from the concept, spirit and scope of the invention. All such similar substitutes and modifications apparent to those skilled in the art are deemed to be within the spirit, scope and concept of the invention as defined by the appended claims.

What is claimed is:

1. A fuel extraction and pressurization system for delivering a gaseous fuel from a fuel storage system to a fuel injection system of an internal combustion engine, wherein the fuel storage system comprises a tank having an interior in which a sorbent is present and to which the gaseous fuel, when in the tank, is adsorbed and wherein the gaseous fuel, when in the tank, is at a tank pressure in a tank pressure range of about 1000 psi (7 MPa) to about 10 psi (0.07 MPa), the fuel extraction and pressurization system configured to have an input that is in fluid connection with the interior of the tank of the fuel storage system and an output in fluid connection with the fuel injection system and operates only when the tank pressure is at or below a specified pressure within the tank pressure range that is necessary to provide the gaseous fuel at a pressure and flow rate to the fuel injection system for the operation of the internal combustion engine at or about the stoichiometric air-fuel ratio for the gaseous fuel at any selected throttle position for the internal combustion engine without increasing the pressure of the gaseous fuel above that of the tank pressure, wherein the fuel extraction and pressurization system comprises one or more vacuum and pressurization components, wherein during operation of the fuel extraction and pressurization system the one or more vacuum and pressurization components apply a vacuum to the interior of the tank to facilitate the extraction of the adsorbed gaseous fuel from the tank and compress the extracted gaseous fuel thereby providing compressed gaseous fuel at an output pressure that is greater than the tank pressure and an output flow rate to the fuel injection system for the operation of the internal combustion engine at or about the stoichiometric air-fuel ratio for the gaseous fuel at any selected throttle position for the internal combustion engine, wherein the one or more vacuum and pressurization components are selected from the group consisting of a vacuum pump, a compressor, or a vacuum pump and a compressor.

2. The fuel extraction and pressurization system of claim 1, wherein the specified pressure within the tank pressure range is about 200 psi (1.38 MPa).

3. The fuel extraction and pressurization system of claim 1, wherein the one or more vacuum and pressurization components is one or more compressors.

4. The fuel extraction and pressurization system of claim 1, wherein the one or more vacuum and pressurization components is a compressor.

5. The fuel extraction and pressurization system of claim 4, wherein the compressor is selected from the group consisting of a rotary scroll compressor, in-line reciprocating compressor, rotary screw compressor, rotary lobe compressor, and rotary vane compressor.

6. The fuel extraction and pressurization system of claim 1, wherein the gaseous fuel is selected from the group consisting of methane, ethane, propane, N-butane, I-pentane, N-pentane, N-hexane, nitrogen, and combinations thereof, and
the sorbent is selected from the group consisting of activated carbon, metal-organic frameworks, and combinations thereof, and
the one or more vacuum and pressurization components is a rotary compressor.

7. The fuel extraction and pressurization system of claim 6, wherein the gaseous fuel is methane, the sorbent is activated carbon, the output flow rate is in a range of about 10 to about 1,200 grams per minute, and the output pressure is in a range of about 20 psi (0.138 MPa) to about 200 psi (1.38 MPa).

8. A fuel system comprising:
(a) a fuel storage system that comprises a tank having an interior in which a sorbent is present and to which a gaseous fuel, when in the tank, is adsorbed, wherein the gaseous fuel, when in the tank, is at a tank pressure in a tank pressure range of about 1000 psi (7 MPa) to about 10 psi (0.07 MPa);
(b) a fuel injection system of an internal combustion engine;
(c) a fueling circuit for delivering the gaseous fuel from the fuel storage system to the fuel injection system of the internal combustion engine, wherein the fueling circuit provides the gaseous fuel at a pressure and flow rate to the fuel injection system for the operation of the internal combustion engine at or about the stoichiometric air-fuel ratio for the gaseous fuel at any selected throttle position for the internal combustion engine at tank pressures greater than a selected tank pressure within the tank pressure range without increasing the pressure of the gaseous fuel above that of the tank pressure; and
(d) an isolated fuel extraction and pressurization system configured to have an input that is in fluid connection with the interior of the tank of the fuel storage system and an output in fluid connection with the fuel injection system and operates only when the tank pressure is at or below the specified pressure within the tank pressure range, wherein the isolated fuel extraction and pressurization system comprises one or more vacuum and pressurization components, wherein during operation of the isolated fuel extraction and pressurization system the one or more vacuum and pressurization components apply a vacuum to the interior of the tank to facilitate the extraction of the adsorbed gaseous fuel from the tank and compress the extracted gaseous fuel thereby providing compressed gaseous fuel at an output pressure that is greater than the tank pressure and an output flow rate to the fuel injection system for the operation of the internal combustion engine at or about the stoichiometric air-fuel ratio for the gaseous fuel at any selected throttle position for the internal combustion engine, wherein the one or more vacuum and pressurization components are selected from the group consisting of a vacuum pump, a compressor, or a vacuum pump and a compressor.

9. The fuel system of claim 8, wherein the specified pressure within the tank pressure range is about 200 psi (1.38 MPa).

10. The fuel system of claim 8, wherein the one or more vacuum and pressurization components is one or more compressors.

11. The fuel system of claim 8, wherein the one or more vacuum and pressurization components is a compressor.

12. The fuel system of claim 11, wherein the compressor is selected from the group consisting of a rotary scroll compressor, in-line reciprocating compressor, rotary screw compressor, rotary lobe compressor, and rotary vane compressor.

13. The fuel system of claim 8, wherein the gaseous fuel is selected from the group consisting of methane, ethane, propane, N-butane, I-pentane, N-pentane, N-hexane, nitrogen, and combinations thereof, and
the sorbent is selected from the group consisting of activated carbon, metal-organic frameworks, and combinations thereof, and
the one or more vacuum and pressurization components is a rotary compressor.

14. The fuel system of claim 13, wherein the gaseous fuel is methane, the sorbent is activated carbon, the output flow rate is in a range of about 10 to about 1,200 grams per minute, and the output pressure is in a range of about 20 psi (0.138 MPa) to about 200 psi (1.38 MPa).

15. A vehicle comprising a fuel system that comprises:
(a) a fuel storage system that comprises a tank having an interior in which a sorbent is present and to which a gaseous fuel, when in the tank, is adsorbed, wherein the gaseous fuel, when in the tank, is at a tank pressure in a tank pressure range of about 1000 psi (7 MPa) to about 10 psi (0.07 MPa);
(b) a fuel injection system of an internal combustion engine; and
(c) a fueling circuit for delivering the gaseous fuel from the fuel storage system to the fuel injection system of the internal combustion engine, wherein the fueling circuit provides the gaseous fuel at a pressure and flow rate to the fuel injection system for the operation of the internal combustion engine at or about the stoichiometric air-fuel ratio for the gaseous fuel at any selected throttle position for the internal combustion engine at tank pressures greater than a selected tank pressure within the tank pressure range without increasing the pressure of the gaseous fuel above that of the tank pressure; and (d) an isolated fuel extraction and pressurization system configured to have an input that is in fluid connection with the interior of the tank of the fuel storage system and an output in fluid connection with the fuel injection system and operates only when the tank pressure is at or below the specified pressure within the tank pressure range, wherein the isolated fuel extraction and pressurization system comprises one or more vacuum and pressurization components, wherein during operation of the isolated fuel extraction and pressurization system the one or more vacuum and pressurization components apply a vacuum to the interior of the tank to facilitate the extraction of the adsorbed gaseous fuel from the tank and compress the extracted gaseous fuel thereby providing compressed gaseous fuel at an output pressure that is greater than the tank pressure and an output flow rate to the fuel injection system for the operation of the internal combustion engine at or about the stoichiometric air-fuel ratio for the gaseous fuel at any selected throttle position for the internal combustion engine, wherein the one or more vacuum and pressurization components are selected from the group consisting of a vacuum pump, a compressor, or a vacuum pump and a compressor.

16. The vehicle of claim 15, wherein the specified pressure within the tank pressure range is 200 psi (1.38 MPa).

17. The vehicle of claim 15, wherein the operation of the fuel extraction and pressurization system occurs when the internal combustion engine requires fuel at tank pressures greater than about 200 psi (1.38 MPa) one or more vacuum and pressurization components is one or more compressors.

18. The vehicle of claim 15, wherein the one or more vacuum and pressurization components is a compressor.

19. The vehicle of claim 18, wherein the compressor is selected from the group consisting of a rotary scroll compressor, in-line reciprocating compressor, rotary screw compressor, rotary lobe compressor, and rotary vane compressor.

20. The vehicle of claim 15, wherein the gaseous fuel is selected from the group consisting of methane, ethane, propane, N-butane, I-pentane, N-pentane, N-hexane, nitrogen, and combinations thereof, and
the sorbent is selected from the group consisting of activated carbon, metal-organic frameworks, and combinations thereof, and
the one or more vacuum and pressurization components is a rotary compressor.

21. The vehicle of claim 20, wherein the gaseous fuel is methane, the sorbent is activated carbon, the output flow rate is in a range of about 10 to about 1,200 grams per minute, and the output pressure is in a range of about 20 psi (0.138 MPa) to about 200 psi (1.38 MPa).

22. A process of delivering a gaseous fuel from a fuel storage system to a fuel injection system of an internal combustion engine, wherein the fuel storage system comprises a tank having an interior in which a sorbent is present and to which the gaseous fuel, when in the tank, is adsorbed and wherein the gaseous fuel, when in the tank, is at a tank pressure in a tank pressure range of about 1000 psi (7 MPa) to about 10 psi (0.07 MPa), the method comprising:

(a) operating a fuel circuit for delivering the gaseous fuel from the fuel storage system to the fuel injection system of the internal combustion engine, wherein the fueling circuit provides the gaseous fuel at a pressure and flow rate to the fuel injection system for the operation of the internal combustion engine at or about the stoichiometric air-fuel ratio for the gaseous fuel at any selected throttle position for the internal combustion engine at tank pressures greater than a selected pressure within the tank pressure range without increasing the pressure of the gaseous fuel above that of the tank pressure; and (b) operating an isolated fuel extraction and pressurization system configured to have an input in fluid connection with the interior of the tank of the fuel storage system and an output in fluid connection with the fuel injection system and operates only when the tank pressure is at or below the specified pressure within the tank pressure range, wherein the isolated fuel extraction and pressurization system comprises one or more vacuum and pressurization components, wherein during operation the one or more vacuum and pressurization components apply a vacuum to the interior of the tank to facilitate the extraction of the adsorbed gaseous fuel from the tank and compress the extracted gaseous fuel thereby providing compressed gaseous fuel at an output pressure that is greater than the tank pressure and an output flow rate to the fuel injection system for the operation of the internal combustion engine at or about the stoichiometric air-fuel ratio for the gaseous fuel at any selected throttle position for the internal combustion engine, wherein the one or more vacuum and pressurization components are selected from the group consisting of a vacuum pump, a compressor, or a vacuum pump and a compressor.

23. The process of claim 22, wherein the specified pressure within the tank pressure range is about 200 psi (1.38 MPa).

24. The process of claim 22, wherein the one or more vacuum and pressurization components is one or more compressors.

25. The process of claim 22, wherein the one or more vacuum and pressurization components is a compressor.

26. The process of claim 25, wherein the compressor is selected from the group consisting of a rotary scroll compressor, in-line reciprocating compressor, rotary screw compressor, rotary lobe compressor, and rotary vane compressor.

27. The process of claim 22, wherein the gaseous fuel is selected from the group consisting of methane, ethane, propane, N-butane, I-pentane, N-pentane, N-hexane, nitrogen, and combinations thereof, and
the sorbent is selected from the group consisting of activated carbon, metal-organic frameworks, and combinations thereof, and
the one or more vacuum and pressurization components is a rotary compressor.

28. The process of claim 27, wherein the gaseous fuel is methane, the sorbent is activated carbon, the output flow rate is in a range of about 10 to about 1,200 grams per minute, and the output pressure is in a range of about 20 psi (0.138 MPa) to about 200 psi (1.38 MPa).

* * * * *